(12) United States Patent
Thomas et al.

(10) Patent No.: US 10,669,489 B2
(45) Date of Patent: Jun. 2, 2020

(54) SYSTEMS AND METHODS FOR CRUDE OIL DESALTING AND DEHYDRATION IN A SINGLE VESSEL

(71) Applicant: VME PROCESS, INC., Tyler, TX (US)

(72) Inventors: Michael Thomas, Tyler, TX (US); Chad Tomlinson, Tyler, TX (US)

(73) Assignee: VME Process, Inc., Tyler, TX (US)

( * ) Notice: Subject to any disclaimer, the term of this patent is extended or adjusted under 35 U.S.C. 154(b) by 157 days.

(21) Appl. No.: 16/066,665

(22) PCT Filed: Feb. 6, 2017

(86) PCT No.: PCT/US2017/016737
§ 371 (c)(1),
(2) Date: Jun. 27, 2018

(87) PCT Pub. No.: WO2018/144037
PCT Pub. Date: Aug. 9, 2018

(65) Prior Publication Data
US 2019/0359895 A1    Nov. 28, 2019

(51) Int. Cl.
*B01D 17/06*     (2006.01)
*C02F 1/463*     (2006.01)
(Continued)

(52) U.S. Cl.
CPC ............ *C10G 32/02* (2013.01); *B01D 17/06* (2013.01); *C02F 1/463* (2013.01); *C10G 33/02* (2013.01);
(Continued)

(58) Field of Classification Search
CPC .......... C10G 33/02; B01D 17/06; C02F 1/463
See application file for complete search history.

(56) References Cited

U.S. PATENT DOCUMENTS

2004/0094421 A1    5/2004   Sams
2008/0251421 A1*  10/2008   Liverud ................. C10G 31/08
                                                          208/187
(Continued)

FOREIGN PATENT DOCUMENTS

CN         102746876 A    10/2012
WO    WO2016160317 A1    10/2016

OTHER PUBLICATIONS

Foreign Communication From a Related Counterpart Application, International Search Report and Written Opinion dated Nov. 3, 2017, International Application No. PCT/US2017/016737 filed on Feb. 6, 2017.

*Primary Examiner* — Brian W Cohen

(57) ABSTRACT

A system for crude oil desalting and dehydration in a single vessel is disclosed. The system comprises a pressure vessel defining a cavity and comprising a sealed bulkhead separating the cavity into a first compartment and a second compartment. Disposed within the first compartment is a first distributor disposed within the first compartment, a first electrical grid assembly, and a transfer conduit that passes through the bulkhead from the first compartment to the second compartment, the second compartment being in fluid communication with the first compartment via the transfer conduit. The pressure vessel may further comprise an overflow weir in the first compartment and a second electrical grid assembly disposed within the second compartment and aligned substantially transverse to a flow path extending from the transfer conduit to the crude collection header.

20 Claims, 6 Drawing Sheets

(51) Int. Cl.
    *C10G 33/02*    (2006.01)
    *C10G 32/02*    (2006.01)
    *C10G 33/08*    (2006.01)

(52) U.S. Cl.
    CPC ..... *C10G 33/08* (2013.01); *C10G 2300/1033* (2013.01); *C10G 2300/201* (2013.01); *C10G 2300/4012* (2013.01)

(56) References Cited

U.S. PATENT DOCUMENTS

2013/0126357 A1    5/2013  Sams et al.
2016/0060546 A1    3/2016  Collins, Jr. et al.
2017/0152162 A1*  6/2017  Cam ........................ C02F 1/463

* cited by examiner

SYSTEMS AND METHODS FOR CRUDE OIL DESALTING AND DEHYDRATION IN A SINGLE VESSEL

CROSS-REFERENCE TO RELATED APPLICATIONS

The present application is a filing under 35 U.S.C. 371 as the National Stage of International Application No. PCT/US2017/016737, filed Feb. 6, 2017, entitled "SYSTEMS AND METHODS FOR CRUDE OIL DESALTING AND DEHYDRATION IN A SINGLE VESSEL," which is incorporated herein by reference in its entirety for all purposes.

BACKGROUND

In some geographical areas, fluid produced from a well may yield crude oil having substantial quantities of water and undesired substances, such as salt. In some instances, the salt and water content may be so high as to interfere with subsequent transportation, storage, and refining of the crude. Salt and water in the crude may be highly deleterious to some metal equipment and piping, and therefore it may be desirable that at least some of the water and undesired substances salt be separated and removed from the crude.

SUMMARY

In an embodiment, a system for crude oil desalting and dehydration in a single vessel is disclosed. The system comprises a pressure vessel defining a cavity and extending along a central axis. The pressure vessel comprises a sealed bulkhead disposed within the cavity, the sealed bulkhead separating the cavity into a first compartment and a second compartment. The pressure vessel further comprises a first distributor disposed within the first compartment, wherein the first distributor is configured to receive a crude oil stream and provide fluid communication into the first compartment via an inlet of the first distributor. The pressure vessel also includes a transfer conduit that is disposed within the cavity and passes through the bulkhead from the first compartment to the second compartment, the second compartment being in fluid communication with the first compartment via the transfer conduit. The pressure vessel comprises a first electrical grid assembly disposed within the first compartment, the first electrical grid assembly disposed between an intake of the transfer conduit and at least a portion of the first distributor. Also included in the pressure vessel is a crude collector disposed within the second compartment, the crude collector comprising a collection header configured to communicate the crude oil out of the second compartment to an outlet of the crude collector. The pressure vessel further comprises a second electrical grid assembly disposed within the second compartment and aligned substantially transverse to a flow path extending from the transfer conduit to the crude collection header.

A method of desalting and dehydrating crude oil via a single pressure vessel is disclosed according to an embodiment. The method comprises receiving a crude oil stream into a first distributor disposed within a first compartment of a pressure vessel, the first compartment being separated from a second compartment by a sealed bulkhead, and the first compartment comprising a first electrical grid assembly. The method continues by injecting, within the first compartment via the first distributor, the crude oil stream before at least a portion of the first electrical grid assembly along a first flow path. The method also includes electrostatically coalescing, by passing the diluted crude oil stream through the first electrical grid assembly being energized to a first voltage potential, water from the crude oil stream into droplets. The method continues with preventing, within the first compartment, coalesced droplets from entering an intake of a transfer conduit by separating the coalesced droplets from the intake of the transfer conduit, wherein the transfer conduit is within the pressure vessel and passes through the sealed bulkhead and fluidly communicates the crude oil stream from the first compartment to the second compartment. The method also includes transferring the crude oil stream to the second compartment via the transfer conduit, and diluting, via a dilution conduit and a fluid mixer inline with the transfer conduit, the crude oil stream in the transfer conduit with water. Subsequent to diluting, the method further includes distributing, via a distributor of the transfer conduit in the second compartment, the diluted crude oil stream before at least a portion of a second electrical grid assembly. The method further comprises electrostatically coalescing, by passing the diluted crude oil stream through the second electrical grid assembly being energized to a second voltage potential, water from the diluted crude oil stream into droplets. Subsequent to the electrostatically coalescing, the method continues with removing crude oil from the second compartment via a crude collector disposed within the second compartment.

A pressure vessel for crude oil desalting and dehydration is disclosed according to another embodiment. The pressure vessel comprises a sealed bulkhead disposed within a cavity defined by the pressure vessel, the sealed bulkhead configured to divide the cavity into a first compartment and a second compartment. The pressure vessel also includes a first distributor disposed within the first compartment, wherein the first distributor is configured to receive a crude oil stream and provide fluid communication into the first compartment via an inlet of the first distributor. The pressure vessel comprises a transfer conduit that is disposed within the cavity and passes through the bulkhead from the first compartment to the second compartment, wherein the transfer conduit comprises a collection header configured to receive the crude oil stream from the first compartment and provide fluid communication to the second compartment via the transfer conduit. Also included in the pressure vessel is a horizontal electrical grid assembly disposed within the first compartment, the horizontal electrical grid assembly disposed between the collection header of the transfer conduit and at least a portion of the first distributor. The pressure vessel further includes an overflow weir disposed within the second compartment, wherein the overflow weir is configured to define a passage over the weir that directs the crude oil stream toward a crude outlet and mitigate coalesced droplets from passing over the overflow weir. Additionally, the pressure vessel comprises a vertical electrical grid assembly disposed within the second compartment and aligned substantially transverse to a horizontal flow path extending from the transfer conduit to the overflow weir, wherein the vertical electrical grid assembly is energized by a direct current (DC) power transformer.

A pressure vessel for crude oil desalting and dehydration is disclosed according to an additional embodiment of the present disclosure. The pressure vessel comprises a sealed bulkhead disposed within a cavity defined by the pressure vessel, the sealed bulkhead configured to divide the cavity into a first compartment and a second compartment. The pressure vessel further comprises a plurality of distributors disposed within the first compartment, wherein each of the plurality of distributors is configured to receive a crude oil stream and provide fluid communication into the first compartment via inlets. The pressure vessel also includes a transfer conduit that is disposed within the cavity and passes through the bulkhead from the first compartment to the second compartment, wherein the transfer conduit comprises a collection header configured to receive the crude oil stream from the first compartment and provide fluid communication to the second compartment via the transfer conduit. The pressure vessel comprises a horizontal electrical grid assembly disposed within the first compartment, the horizontal electrical grid assembly disposed between the collection header of the transfer conduit and at least one of the plurality of distributors. Additionally, the pressure vessel comprises a fluid mixer within the pressure vessel and is in fluid communication with the transfer conduit and disposed between the collection header of the transfer conduit and a distributor of the transfer conduit disposed in the second compartment. The pressure vessel further comprises a crude collector disposed within the second compartment, the crude collector comprising a collection header configured to communicate fluid out of the second compartment to an outlet of the crude collector. The pressure vessel also includes a second horizontal electrical grid assembly disposed within the second compartment and aligned substantially transverse to a flow path extending from the transfer conduit to the crude collection header.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
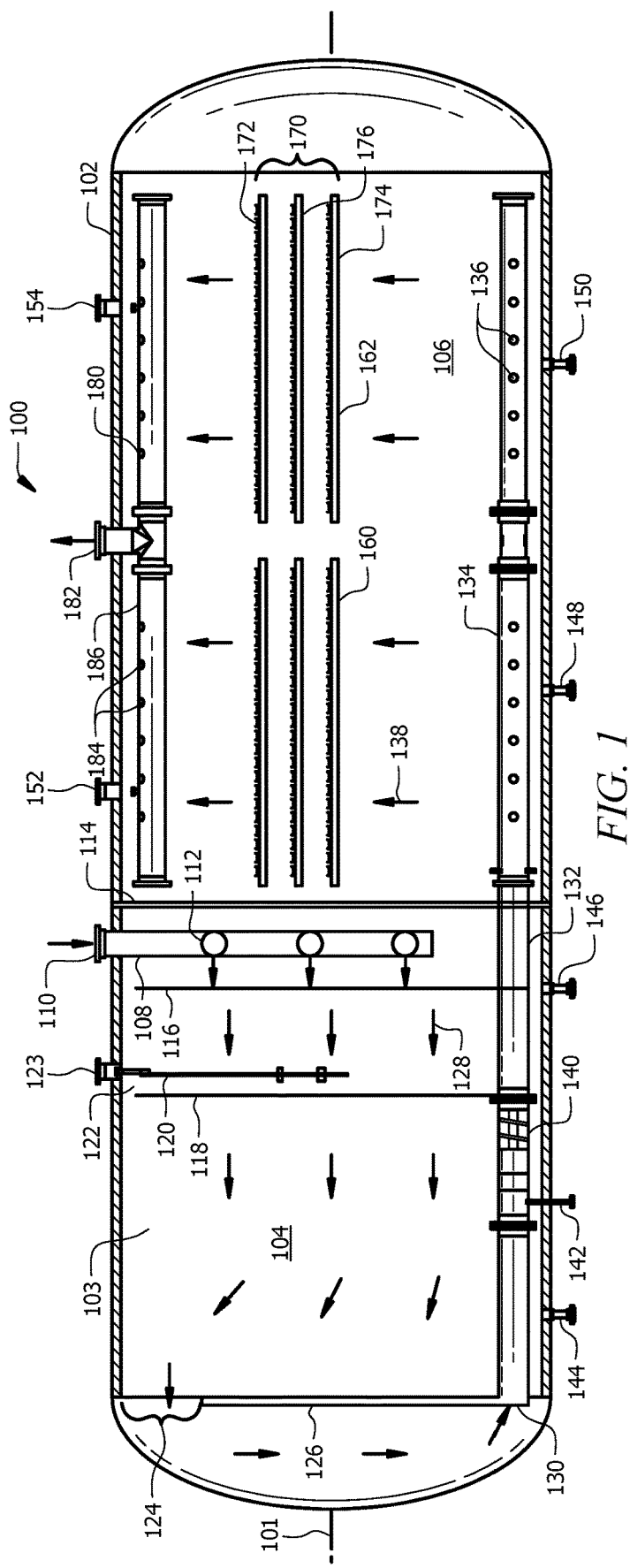
FIG. 1 illustrates a pressure vessel according to an embodiment of the disclosure.
Figure 2:
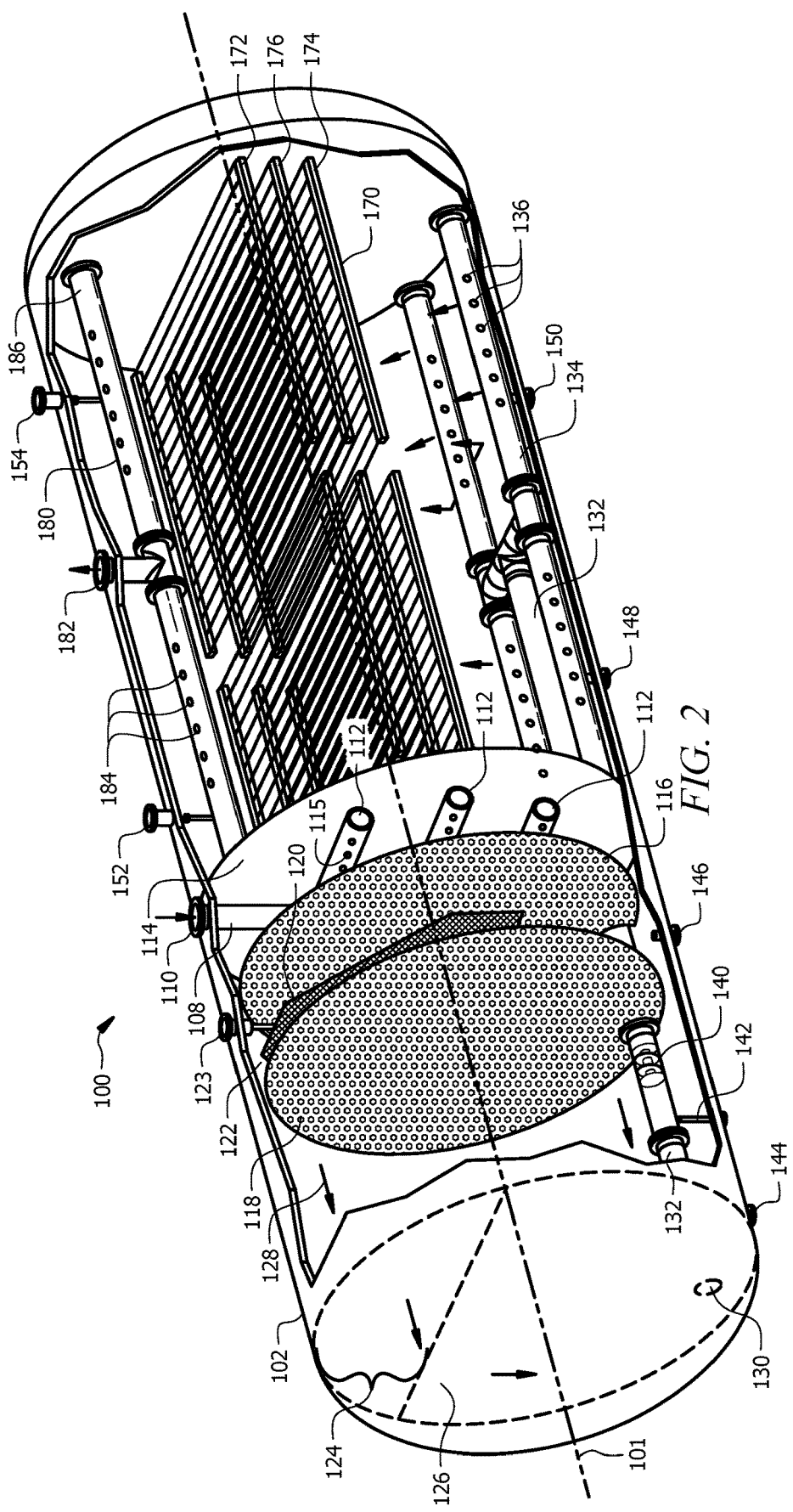
FIG. 2 illustrates an isometric view of the pressure vessel according to the embodiment of FIG. 1.
Figure 3:
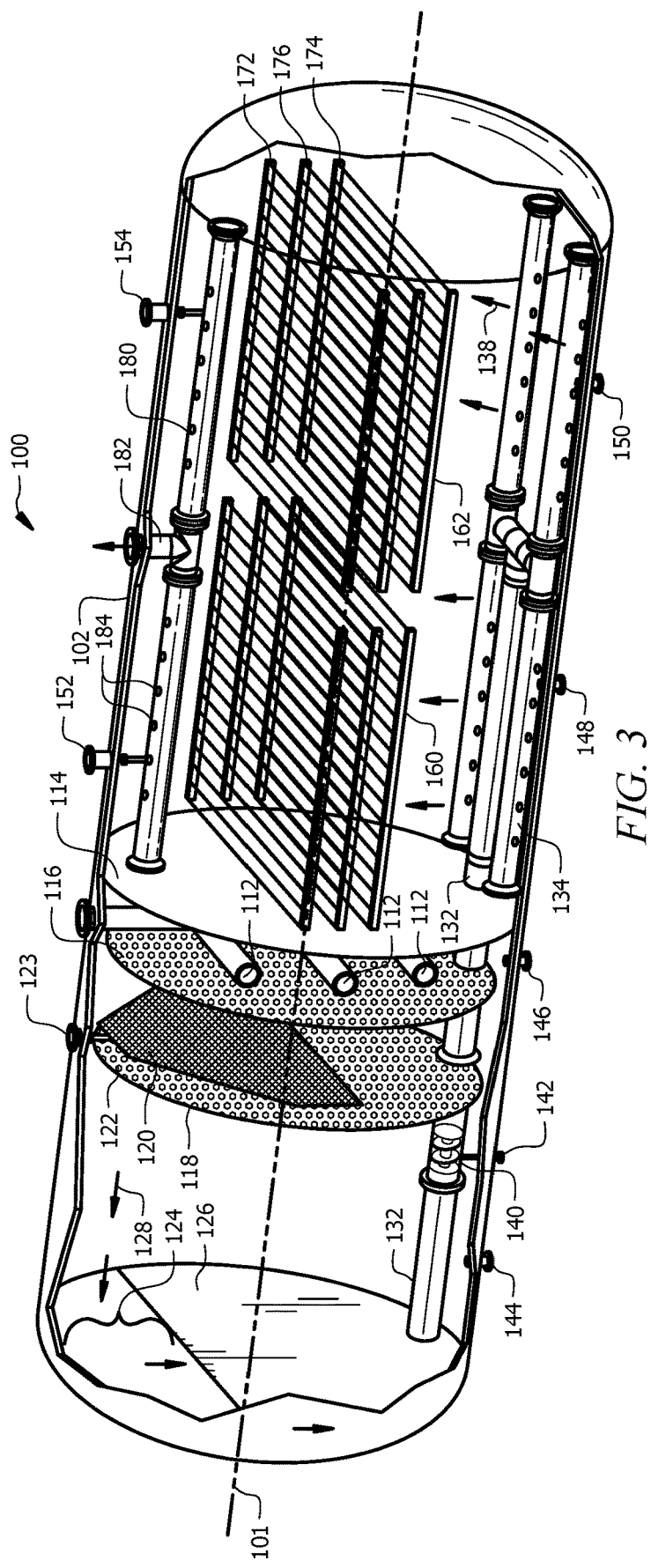
FIG. 3 illustrates another isometric view of the pressure vessel according to the embodiment of FIG. 1.
Figure 4:
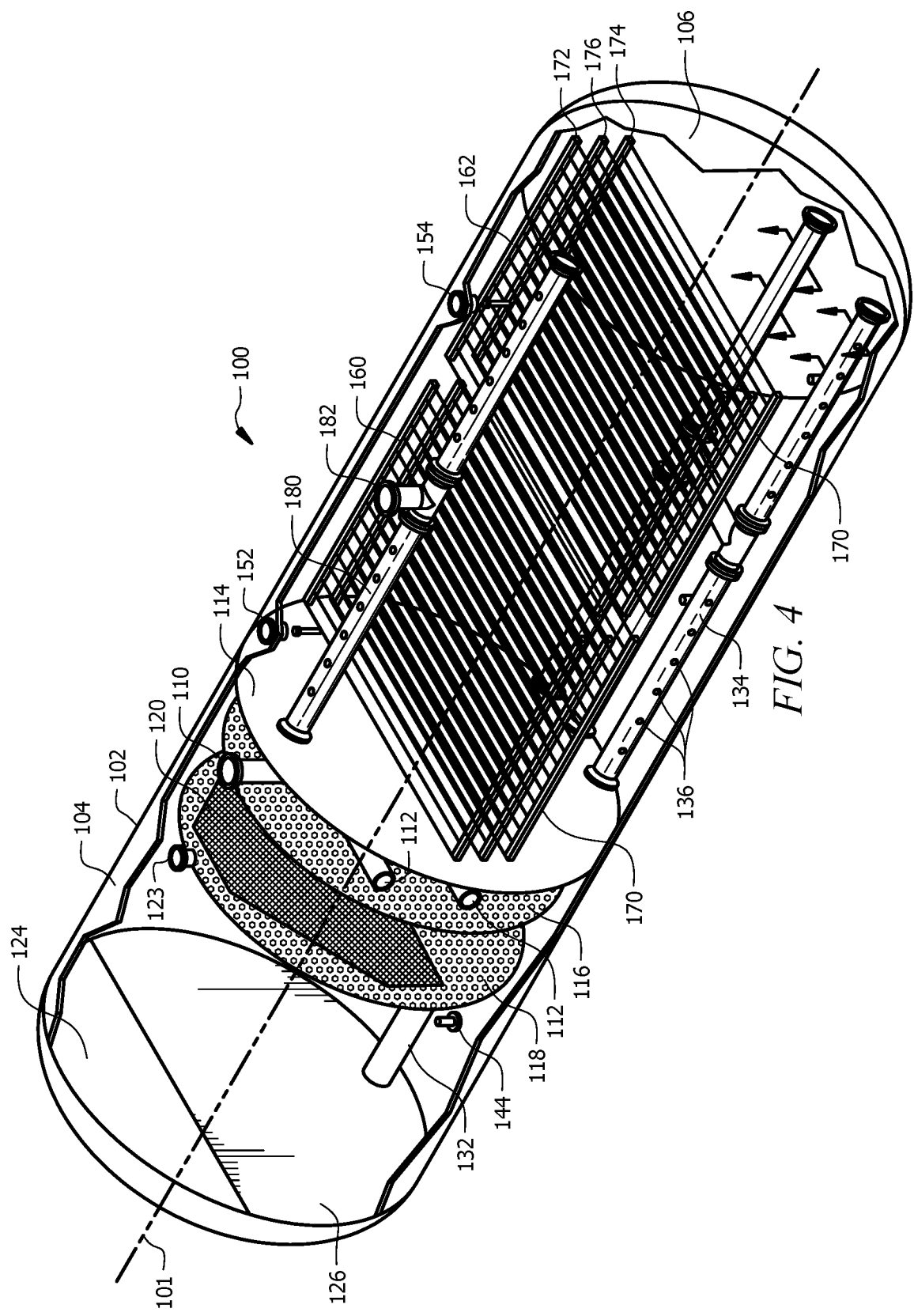
FIG. 4 illustrates a third isometric view of the pressure vessel according to the embodiment of FIG. 1.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Crude oil can be extracted from a well as a stream of fluids, which may include not only the crude oil, but also other substances such as water and gas. The well stream may also contain unwanted substances, such as salts. These unwanted substances can be carried as a mixture in the water. The proportions of unwanted substances, water, gas, and oil in the well stream may vary according to the circumstances of the particular well over the life of the field. A mixture of water and unwanted substances may typically be in the form of droplets carried in the oil. It may be desirable to isolate and remove at least some of the water and unwanted substances from the crude oil. Separating the water from the oil can remove most of the unwanted substances (e.g., salts) because these unwanted substances are dissolved in the water. Because it may not be feasible to separate all of the water from the oil, the salt concentration in the oil may be reduced to an acceptable level. A typical two-stage desalting process can consist of two separate vessels in connection with equipment external to each vessel for injection of freshwater or dilution water in between. Problems can arise with this configuration because each vessel is large and heavy. Interconnecting pipes and other equipment also contribute to the overall size, weight, and costs. Frequently, the desalting process is carried out on a production platform where space and weight are at a premium.

Embodiments of the present disclosure include a multistage system for crude oil desalting and dehydration in a single pressure vessel that is separated into at least two different compartments via a sealed bulkhead. In an embodiment, each compartment may comprise at least one of a vertical electrical grid assembly or a horizontal electrical grid assembly. Each grid assembly may comprise two or more electrical grids, where the electrical grids have at least two electrical grids with one electrical grid being energized at an applied voltage and the second electrical grid being at a different (or zero) voltage such that a voltage potential difference is created between the electrical grids, thereby causing the dispersed polarized water droplets in a crude oil stream to attract and coalesce. Each horizontal or vertical grid assembly may be energized by one or more electrical power transformers. Each electrical grid assembly may be powered by the same transformer or from different transformers that apply similar or differing high voltage. For example, in some embodiments, an AC transformer may provide from about 0 kilovolts (kV) to about 50 kV, or from about 0 kV to about 40 kV, or from about 0 kV to about 30 kV, or from about 10 to about 25 kV, and a DC transformer may provide from about negative 40 kV to about 40 kV, or from about negative 20 kV to about 20 kV.

In some embodiments, the system comprises two or more electrical power transformers that provide the pressure vessel's electrical grid assemblies with the same or different applied voltages. When AC current is used, each electrical grid assembly may be configured to use two different transformers operating out of phase with the other such that the separate electrical grids in one assembly are electrically out of phase with each other. When electrical grids in the same electrical grid assembly use different transformers, each electrical grid may be rated to withstand the same or different kilovolt-amperage (kVA), referred to as a KVA rating. Transformer(s) with a higher KVA rating may be used when the oil stream comprises a high amount of emulsified water (e.g., over 30% emulsified water by volume) because this oil stream can carry more current. If alternating current is used to energize a grid assembly, the transformers may be configured as step-up transformers that are in series with a current-limiting reactor. The drier the crude oil stream becomes as it flows past the first electrical grid assembly in the first compartment, through the transfer conduit into the second compartment, the more applied voltage is used to cause droplet coalescence. Embodiments of the present disclosure provide a pressure vessel with adjustable electrical grids allowing the voltage potential between electrical grids to be adjusted by adjusting the spacing between the electrical grids themselves within each electrical grid assembly. This may allow the design to be varied as the fluid composition changes over time.

Embodiments of the pressure vessel include a dilution conduit configured to allow for the injection and mixing of dilution fluid (e.g., a diluent such as water, a solvent, a polymer, etc. and/or demulsifying chemicals) between desalter stages and between compartments within the pressure vessel using a fluid mixer. Embodiments of the fluid mixer may include a static mixer (e.g., a spiral nozzle or diffuser) or an externally adjustable mixer, where the fluid mixer can be placed within the pressure vessel and in fluid communication with the transfer conduit. The transfer of the oil-water emulsion stream between compartments can be accomplished entirely inside the pressure vessel via at least one of an overflow weir or a collection header in order to provide intake for a transfer conduit which, in turn, passes through the sealed bulkhead within the pressure vessel. In some embodiments, the transfer of fluids can pass between compartments through a conduit outside of the pressure vessel. In this embodiment, the mixer may be external to the pressure vessel. When fluids (e.g., a crude oil stream before or after supplemental dilution) are distributed into a compartment having a horizontal electrical grid assembly (whether it be in the first compartment or second compartment of the pressure vessel), the distribution can occur via a radial disc assembly directly between the electrical grids of an electrical grid assembly or via a distribution header of a distributor located under the bottom grid of the electrical grid assembly.

In another embodiment of the present disclosure, a pressure vessel may be configured to handle lighter crude oils (e.g., a crude oil stream having from 0-30% water by liquid volume) such that the first compartment comprises a horizontal electrical grid assembly (thus being the first stage) where the crude oil emulsion entering the first stage comprises an inlet water content ranging from about 0-30% by liquid volume. The horizontal electrical grid assembly may be powered with, for example, one or more AC transformer(s). The oil-water emulsion exiting the first stage (e.g., crude oil stream after passing through the energized horizontal electrical grid assembly) can pass into the transfer conduit and be mixed with fresh dilution water using the fluid mixer (e.g., static mixer disposed within the transfer conduit) and enter the second stage desalter (e.g., second compartment comprising vertical grid section powered by, for example, a DC transformer). The transformer may be configured to operate at variable voltage to coalesce the remaining water droplets ranging from 1-5% by volume.

In some embodiments of the present disclosure, the pressure vessel may include two or more vertical or horizontal electrical grid assemblies in a single compartment and have a dilution conduit that allows for the addition of dilution fluid (e.g., a diluent such as water, recycled coalesced water, etc.) for mixing by a fluid mixer before reaching another compartment. It is understood that for each embodiment of a pressure vessel, dilution fluid (e.g. a diluent such as fresh dilution water) may be added into the pressure vessel prior to the internal fluid mixer on the last stage of desalting. The effluent water from the last stage of desalting (e.g., last compartment within a pressure vessel) may be withdrawn externally and pumped back to the stage immediately preceding the last stage (e.g., compartment immediately preceding the last compartment). If such compartment is the first stage of the overall system, then the recycled water may be added externally to the oil-water mixture upstream of a fluid mixer before entering the pressure vessel and/or discarded.

Turning now to FIGS. 1-4, a system 100 for crude oil desalting and dehydration is disclosed. The system 100 comprises a pressure vessel 102 defining a cavity 103 and extending along a central axis 101. The pressure vessel 102 comprises a sealed bulkhead 114 disposed within the cavity 103. The sealed bulkhead 114 is configured to separate the cavity 103 into a first compartment 104 and a second compartment 106. In an embodiment, the sealed bulkhead 114 is illustrated as a vertical wall or plate that separates the cavity and can be substantially orthogonal to the central axis 101 or disposed at any other suitable angle. For example, the sealed bulkhead may be transverse and at a diagonal to the central axis (e.g., at an acute or obtuse angle relative to the central axis) instead of being substantially orthogonal. The sealed bulkhead may be welded to form an internal seam with an internal wall of the pressure vessel 102 such that no liquid passage is permitted between the first compartment 104 and second compartment 106. In some embodiments, a controlled fluid communication via a transfer conduit 132 can pass through the sealed bulkhead, as further discussed below.

The pressure vessel 102 comprises a first distributor 108 disposed within the first compartment 104. The first distributor 108 is configured to receive a crude oil stream and provide fluid communication into the first compartment 104 via an inlet 110 of the first distributor 108. In the embodiment illustrated in FIGS. 1-4, the first distributor 108 comprises a distribution header 112 with multiple pipes having perforations 115 that allow for fluid communication of the incoming crude oil stream from the inlet 110 to the first compartment 104 along flow path 128. The pressure vessel 102 may comprise a first flow conditioning baffle 116 disposed downstream of the first distributor 108, and define holes in a pattern that is configured to help break up the velocity profile and dampen turbulence of the crude oil stream passing through. The pressure vessel 102 may comprise a second flow conditioning baffle such as conditioning flow baffle 118, which can be optionally grounded in some instances, that is downstream of the first flow conditioning baffle 116. Hole patterns may be staggered on (and relative to) each of the first flow conditioning baffle 116, flow conditioning baffle 118, so as to provide maximum flow straightening of the crude oil stream.

The second flow conditioning baffle 118 may also be used to provide a voltage differential for a first electrical grid assembly 122 that is disposed within the first compartment 104. In some embodiments, the second flow conditioning baffle 118 can be grounded, though the second flow conditioning baffle 118 can also be at a differential voltage other than ground in order to provide a voltage differential for the first electric grid assembly 122. The second flow conditioning baffle 118 may have a plurality of insulators around its perimeter holding the second flow conditioning baffle 118 to the interior wall of the pressure vessel 102 if the baffle 118 is optionally at a differential voltage than the electrical grid 120. In some embodiments, the baffle 118 may be mechanically and/or electrically coupled to the interior wall of the pressure vessel 102 to ground the baffle 118 when the baffle 118 is used at a ground potential. The first electrical grid assembly 122 also comprises at least one grid element (e.g., electrical grid 120) that is configured to be energized by a power transformer (e.g., an AC and/or DC transformer). An electrical conduit 123 passes through the wall of pressure vessel 102 to allow for an electrical wire to energize a grid element (e.g., electrical grid 120). As the crude oil stream traveling along flow path 128 passes the first conditioning baffle 116, first electrical grid assembly 122 is configured to create a first voltage potential that electrostatically coalesces water from the crude oil stream into droplets before the intake 130 of the transfer conduit 132.

The first electrical grid assembly 122 comprises at least one electrical grid 120 and at least one flow conditioning baffle 118. In some embodiments, the electrical grid 120 and the flow conditioning baffle 118 may each be referred to as grid elements of an electrical grid assembly (e.g., first electrical grid assembly 122). In some embodiments, the shape and size of the electrical grid 120 may be configured in a shape that provides a surface area sufficient to produce a voltage potential between 1% and 100% of the surface area of the flow conditioning baffle 118. The flow conditioning baffle 118 may be grounded (e.g., at zero voltage) or at a voltage that provides at least a predefined voltage potential due to the relative voltage of electrical grid 120. Each of the flow conditioning baffle 118 and the electrical grid 120 are configured to define a plurality of openings in which flow paths 128 (carrying the crude oil stream) may pass through. It is understood that a gap may exist between an electrical grid 120 and a flow conditioning baffle 118.

In some embodiments, the first electrical grid assembly 122 may comprise a spacing adjuster configured to vary a distance (i.e., the gap) between at least two of the grid elements (e.g., the electrical grid 120 and the flow conditioning baffle 118. For example, the spacing adjuster may comprise a turnbuckle that adjusts the distance between the electrical grid 120 and the flow conditioning baffle 118. Similarly, in some embodiments, the second electrical grid assembly 170 in the second compartment 106 may implement a spacing adjuster to vary the distance (e.g., gap) between grid elements making up the second electrical grid assembly 170 (e.g., gaps formed between grid 176 and electrical grids 172, 174). Thus, in some embodiments, the first electrical grid assembly 122 and second electrical grid assembly 170 may be referred to as adjustable electrical grid assemblies and each may be configured to allow the voltage potential between grid elements (e.g., between 120 and 118, 174 and 176, or 172 and 176) to be adjusted by adjusting the spacing between the electrical grids themselves within each of the first electrical grid assembly 122 and second electrical grid assembly 170. The first electrical grid assembly 122 is disposed upstream from the intake 130 of the transfer conduit 132, specifically between the intake 130 and at least a portion of the first distributor 108. In some embodiments, the first distributor 108 may include a radial distribution header that is disposed between the flow conditioning baffle 118 and electrical grid 120, and thus at all times, the first electrical grid assembly 122 is disposed between the intake 130 and at least a portion of first distributor 108.

The pressure vessel 102 may further comprise an overflow weir 126 disposed within the first compartment 104. The overflow weir 126 is configured to define a passage 124 over the overflow weir 126, which in turn direct the crude oil stream from flow path 128 toward the intake 130 of the transfer conduit 132. The overflow weir 126 is also configured to mitigate coalesced droplets (removed from the crude oil stream) from entering the intake 130 of the transfer conduit 132. This may be accomplished by the overflow weir 126 forming a seal with the inner walls of the pressure vessel 102 except through the passage 124, which is at an elevation that is higher than the water level formed from the coalesced droplets can reach. The coalesced droplets (e.g., water) may be removed from the first compartment 104 via outlets 144, 146.

The pressure vessel 102 further comprises transfer conduit 132 that provides fluid communication between the first compartment 104 and the second compartment 106. In some embodiments, the transfer conduit 132 can be disposed within the cavity 103 and pass through the sealed bulkhead 114 from the first compartment 104 to the second compartment 106. In other embodiments, the transfer conduit 132 can pass outside of the pressure vessel 102 from the first compartment and re-enter the pressure vessel 102 within the second compartment 106 to provide the fluid communication between the two compartments 104, 106. The second compartment 106 is in fluid communication with the first compartment 104 via the transfer conduit 132. The transfer conduit 132 can comprise a distributor 134, which is configured to be a distribution header arranged in an H-type configuration. In some embodiments, the distributor 134 of the transfer conduit 132 has perforations 136 that provide fluid communication into the second compartment 106, where the perforations 136 can be on the sides of the distributor 134 (e.g., between about 90 degrees and about 270 degrees relative to the vertical flow path 138 in the second compartment 106). Having perforations 136 arranged on the sides of the distributor 134 can provide for ejection of the fluids in a horizontal direction, thereby minimizing maldistribution of the fluids, while also allowing for even distribution into the second compartment 106 and lower vertical flow velocity than if the perforations were in the same direction as the vertical flow path 138.

The pressure vessel 102 may further comprise a fluid mixer 140, where the fluid mixer 140 is in fluid communication with the transfer conduit 132 and disposed between the intake 130 and the distributor 134 of the transfer conduit 132. When the transfer conduit 132 is internal to the pressure vessel, the fluid mixer 140 can reside within the pressure vessel and within the first compartment 104. In some embodiments, the fluid mixer 140 may reside at another position along the transfer conduit 132, such as at the sealed bulkhead 114 and/or within the second compartment 106. In some embodiments, the transfer conduit 132 may comprise a pipe that houses the fluid mixer 140 along the fluid communication path therein. The fluid mixer 140 is illustrated as a static mixer that is configured with spiraled ridges arrayed around the central axis of the fluid mixer 140. In other embodiments, the fluid mixer 140 may comprise a static mixer, an externally adjustable mixer, or a combination thereof.

The pressure vessel 102 may further comprise a dilution conduit 142 that defines a channel extending from outside the cavity 103 and into the transfer conduit 132. The dilution conduit 142 may be configured to introduce dilution fluid within the transfer conduit 132 and upstream of the fluid mixer 140. Dilution fluid can comprise at least one of a diluent such as an aqueous fluid (e.g., fresh water, recycled coalesced or separated water, etc.), a solvent, a polymer, or the like, or a demulsifier, or a combination thereof. A demulsifier may comprise a chemical that aids in separation of the water from an emulsion of water and crude oil and alters the kinetic stability by changing the interfacial film encapsulating the water droplets to allow the water droplets to separate from the crude oil. The introduction of dilution fluid via the dilution conduit 142 may assist in the demulsification of the crude oil stream passing through the transfer conduit and/or the further removal of salts from the crude oil. The arranged combination of the fluid mixer 140 agitating the crude oil stream, causing a change in temperature and/or pressure, the distributor 134 altering flow velocity via perforations 136, and the first electrical grid assembly 122 and second electrical grid assembly 170 providing electrical coalescence via electrostatic fields which, upon being energized, can provide for a more efficient dehydration and desalting system within the single pressure vessel 102.

The pressure vessel 102 further comprises a second electrical grid assembly 170 disposed within the second compartment 106. In some embodiments, the second electrical grid assembly 170 can be aligned substantially transverse to flow path 138. The flow path 138 can extend from the transfer conduit 132 (specifically after exiting from the perforations 136 of distributor 134) and vertically through the second electrical grid assembly 170 to the crude collection header 180. The second electrical grid assembly 170 is disposed between the crude collection header 180 and at least a portion of the transfer conduit 132, specifically distributor 134. In some embodiments, distributor 134 may comprise a radial distributor that is at least partially disposed between the electrical grid elements 172-176 of the second electrical grid assembly 170. The second electrical grid assembly 170 comprises at least two grid elements (e.g., electrical grids 172, 174, and grid 176) that each extend substantially orthogonal to the first electrical grid assembly 122. Put simply, the first electrical grid assembly 122 may be a vertical electrical grid assembly while the second electrical grid assembly is a horizontal electrical grid assembly. It is understood that, in some embodiments, the electrical grid assemblies (e.g., 122, 170) may not be exactly vertical or horizontal, but rather be diagonal to the central axis, while also remaining orthogonal to their respective flow paths 128, 138 flowing there through.

The second electrical grid assembly 170 is configured to create a second voltage potential that electrostatically coalesces water into droplets before the collection header 186 of crude collection header 180. The second voltage potential created by the second electrical grid assembly 170 (specifically between electrical grids 172 and 174 which are energized by a power transformer, and a grid 176) can have a greater absolute magnitude than the first voltage potential created by the first electrical grid assembly 122 (specifically between electrical grid 120 and the flow conditioning baffle 118 upon being energized by a power transformer).

In some embodiments, second electrical grid assembly 170 comprises at least two sets of electrical grids, such as electrical grid set 160 (closer to the sealed bulkhead 114) and the second electrical grid set 162. In some embodiments, the first electrical grid set 160 is configured to be electrically out of phase from the second electrical grid set 162 in response to being energized by one or more power transformers. Thus, as illustrated in FIGS. 1-4, the second electrical grid assembly 170 comprises the first electrical grid set 160 and the second electrical grid set 162, where the first electrical grid set 160 (and thus also the second electrical grid assembly 170) comprises electrical grids 172, 174 and grid 176. The second electrical grid set 162 may comprise electrical grids and a grid similar to that of the first electrical grid set 160.

In some embodiments, certain grids between the first electrical grid set 160 and the second electrical grid set 162 can be electrically coupled. The interconnection can allow for power configurations to allow the electrical energy to be out of phase between the two grid sets 160, 162. For example, a central grid in the first electrical grid set 160 can be electrically coupled to one or more of the grids (e.g., grid 172 and/or grid 174) of the second electrical grid set 162. This may provide for additional separation power between the stacked grids 172, 176 and/or between stacked grids 174, 176.

The second electrical grid assembly 170 can be formed from any suitable conductive material that provides for pores or openings through which the fluids can pass. In some embodiments, the grids in the second electrical grid assembly 170 can comprise screens, perforated plates, mesh, or the like. In some embodiments, at least a portion of the grids in the second electrical grid assembly 170 can be formed from one or more hollow conductive tubes. The tubes can be electrically coupled to form a grid assembly. In some embodiments, the tubes can have an outer diameter on the order of 0.25 inches to about 2 inches, or between about 0.5 inches to about 1.5 inches, and the tubes can be formed from a conductive material such as metal, alloy, or other type of material. The use of hollow tubes provides for a large contact area while remaining lightweight.

Electrical conduits 152, 154 may pass electrical wires through the wall of the pressure vessel 102 while electrically insulating the wires from the vessel itself, and electrically couple the wires to the second electrical grid assembly 170 via electrical grids 172 and 174. Grid 176 may be disposed between electrical grids 172 and 174. The grid 176 may allow for a voltage potential to be created within the second electrical grid assembly 170 via an electrical connection. The electrical connection can be coupled to a power source when the grid 176 is at a differential voltage or a grounding wire when the grid 176 is at ground potential. As discussed above, in some embodiments, the distance between the electrical grids 172, 174 and grid 176 may be adjustable, thereby allowing dynamic variation of the electrical field and voltage potential to provide additional droplet coalescence in the second compartment 106. Water and other effluent that is coalesced into droplets may fall towards and past the transfer conduit's 132 distributor 134 and exit the pressure vessel via outlets 148, 150.

The pressure vessel 102 further comprises a crude collection header 180 disposed within the second compartment 106. The pressure vessel 102 can be configured to provide a pressure differential between inlet 110 of the first distributor 108 and the outlet 182 of the crude collection header 180, thereby allowing for the communication of fluid (e.g., the crude oil stream) along flow path 128, through the transfer conduit 132, and along flow path 138, which exits the pressure vessel 102 via outlet 182. The crude collection header 180 comprises a collection header 186, outlet 182, and perforations 184 defined by the collection header 186. The collection header 186 is configured to communicate the crude oil stream (after it is passed across the second electrical grid assembly 170) out of the second compartment 106 via the outlet 182 of the crude collection header 180.

Figure 5:
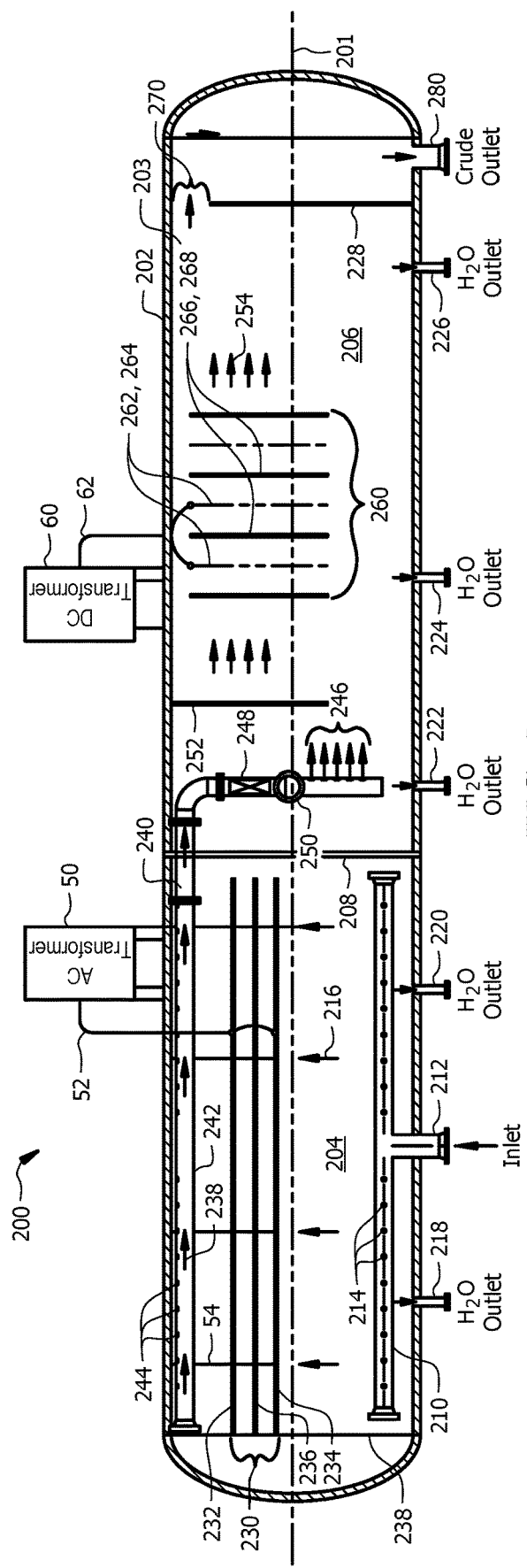
FIG. 5 illustrates a pressure vessel according to another embodiment of the disclosure.

Turning now to FIG. 5, a system 200 for desalting and dehydrating crude oil is disclosed according to an embodiment of the present disclosure. The system 200 comprises pressure vessel 202. The pressure vessel 202 can be the same or similar to the pressure vessel 102 described with respect to FIGS. 1-4, and the discussion with respect to the pressure vessel 102 can apply with respect to the pressure vessel 202. As shown in FIG. 5, the pressure vessel 202 comprises a sealed bulkhead 208 disposed within a cavity 203 defined by the pressure vessel 202, where the sealed bulkhead 208 is configured to divide the cavity 203 into a first compartment 204 and a second compartment 206. A first distributor 210 is disposed within the first compartment 204, and the first distributor 210 is configured to receive a crude oil stream via inlet 212, and in turn providing fluid communication of the crude oil stream into the first compartment 204 via perforations 214 of the first distributor 210. In some embodiments, the distributor 210 includes a pipe extending along central axis 201, between the sealed bulkhead 208 and an end of the pressure vessel. The inlet 212 may be oriented in a direction substantially parallel to the flow path 216, which is orthogonal to an electrical grid assembly (e.g., horizontal electrical grid assembly 230). To reduce flow velocity and provide a more even distribution of the crude oil stream within the first compartment 204, the distributor 210 may be configured with a plurality of perforations 214 defined along the side (e.g., aligned between about 90 degrees and about 270 degrees relative to the inlet 212), thereby initially ejecting fluids horizontally within the pressure vessel before the fluid align vertically along flow path 216.

The pressure vessel 202 further comprises a horizontal electrical grid assembly 230 disposed within the first compartment 204. The horizontal electrical grid assembly 230 is disposed substantially parallel to the central axis 201 and located between the collection header 242 of the transfer conduit 240 and at least a portion of the first distributor 210. The horizontal electrical grid assembly 230 can be the same or similar to the horizontal electrical grid assembly 170, and any of the considerations described with respect to the horizontal grid assembly 170 can also apply to the horizontal electrical grid assembly 230. The horizontal electrical grid assembly 230 is downstream of the first distributor 210 and disposed within the first compartment such that flow path 216 of the crude oil stream is substantially orthogonal to the electrical grid elements (e.g., electrical grids 232, 234, and grid 236) of horizontal electrical grid assembly 230. The horizontal electrical grid assembly 230 comprises at least two grid elements, with at least one of them configured to be energized. For example, the horizontal electrical grid assembly 230 is configured to be energized by a power transformer unit, such as alternating current (AC) power transformer 50. In some embodiments, electrical conduits may allow for wiring 52 to pass through the wall of the pressure vessel 202 and electrically couple to one or more electrical grid elements, such as electrical grids 232 and 234.

Two or more of the electrical grid elements, such as electrical grids 232, 234, and 236, may comprise conductive metal grids that are operable for being energized to a first potential, and while a third electrical grid element may be at a differential voltage potential. For example, one of the grids can be grounded via a grounding wire 54, thereby allowing the grid 236 to have a zero voltage. In other embodiments, the grids can be placed at differential voltages so that a voltage potential exists between the grids without having any of the grids grounded. With the grid 236 being disposed between electrical grids 232 and 234, the horizontal electrical grid assembly 230 can be configured to create a first voltage potential that electrostatically coalesces water from the crude oil stream (travelling along flow path 216) into droplets before reaching the collection header 242 of the transfer conduit 240. In some embodiments, the horizontal electrical grid assembly 230 comprises a spacing adjuster configured to vary a distance between at least two of the grid elements, such as between electrical grid 232 and grid 236, or electrical grid 234 and grid 236. The pressure vessel 202 is configured to remove droplets that are coalesced out of the crude oil stream passing along flow path 216 via outlets 218 and 220. In some embodiments, at least a portion of the effluent water may be used as a dilution fluid that is injected via a dilution conduit. While three grids 232, 234, and 236 are shown as making up the horizontal grid assembly 230, only two grids, or more than three grids can be used to form the horizontal grid assembly 230, including being arranged in series and/or parallel.

The pressure vessel 202 comprises a transfer conduit 240 that can be disposed within the cavity 203, and passes through the sealed bulkhead 208 from the first compartment 204 to the second compartment 206. In some embodiments, a portion of the transfer conduit 240 can pass outside of the pressure vessel 202. The transfer conduit 240 comprises a collection header 242 configured to receive the crude oil stream via perforations 244. The crude oil stream may be received in the transfer conduit 240 from the flow path 216 in first compartment 204 and provide fluid communication along flow path 238 to the second compartment 206. The pressure vessel 202 may comprise a fluid mixer 248 that is in fluid communication with the transfer conduit 240 and disposed between an intake of the transfer conduit (e.g., perforations 244 in collection header 242) and a distributor 250 of the transfer conduit 240. The crude oil stream passing from the first compartment 204 through transfer conduit 240 and the fluid mixer 248, may exit into the second compartment 206 via a plurality of perforations 246 defined by distributor 250 of transfer conduit 240. The fluid mixer 248 may comprise a static mixer, an externally adjustable mixer, or a combination thereof. In some embodiments, the pressure vessel 202 further comprises a dilution conduit that defines a channel extending from outside the cavity 203 and into the transfer conduit 240. The dilution conduit may be configured to introduce dilution fluid into the transfer conduit 240 and upstream of the fluid mixer 248. Dilution fluid may comprise at least one of water, a demulsifier, or a combination thereof.

The pressure vessel 202 further comprises a vertical electrical grid assembly 260 disposed within the second compartment 206. The vertical electrical grid assembly 260 may be disposed between the overflow weir 228 and at least a portion of the transfer conduit 240, such as a portion of distributor 250. The vertical grid assembly 260 may be aligned substantially transverse to a horizontal flow path 254, in which the flow path 254 extends from the transfer conduit 240 to an overflow weir 228. The vertical electrical grid assembly 260 comprises an array of vertically parallel electrical grid elements (e.g., electrical grids 262, 264, and grids 266, 268), where the each of the grid elements are orthogonal to the flow path 254 carrying the crude oil stream. In some embodiments, the second compartment 206 may comprise a flow conditioning baffle 252, which includes a perforated plate that defines holes through which the crude oil stream can pass while traveling along the flow path 254.

The vertical electrical grid assembly 260 is energized by a direct current (DC) power transformer 60 via wiring 62 that may pass through an electrical conduit of the pressure vessel 202. In some embodiments, the vertical electrical grid assembly 260 comprises at least two grid elements (e.g., any of 262-268), with each grid element extending substantially orthogonal to the horizontal electrical grid assembly 230 (e.g., transverse to the central axis 201). The vertical electrical grid assembly 260, upon being energized by DC power transformer 60, is configured to create a voltage potential that electrostatically coalesces water into droplets before the overflow weir 228. This voltage potential may be created by the DC power transformer 60 applying a voltage to electrical grids 262 and 264, while grids 266 and 268 remain at a different voltage potential. For example, the grids 266, 268 can be grounded (thus at zero voltage), thereby creating voltage potential. However, in some embodiments, the grids 266, 268 can be energized with a different voltage (e.g., a negative voltage, a different positive voltage, etc.) to create the voltage potential between the grids. In some embodiments, the grids 266, 268 may not be at exactly zero voltage, but rather at a predefined voltage such that a voltage differential is created so as to provide electrical coalescence. Each of the grids 266, 268 and electrical grids 262, 264 define holes through which the crude oil flowing along horizontal flow path 254 may pass.

In some embodiments, the crude oil stream comprises an emulsion that enters the first compartment 204 with a water content ranging from zero to approximately 30% by liquid volume. In some embodiments, the DC power transformer 60 may energize the vertical electrical grid assembly 260 to operate at variable voltage in order to coalesce the remaining water droplets and yield a crude oil stream (after passing through the vertical electrical grid assembly along flow path 254) that has a water content ranging from about 0-5% by liquid volume (thus yielding a drier crude oil stream exiting the crude outlet 280 than when it entered via inlet 212. The voltage potential created by the vertical electrical grid assembly 260 upon being energized may be referred to as a second voltage potential and the voltage potential created by the horizontal electrical grid assembly 230 may be referred to as a first voltage potential. Because the crude oil stream may be drier when entering the second compartment 206 (e.g., the water content by fluid volume in the crude oil stream being less due to droplet coalescence from at least the horizontal electrical grid assembly 230), the vertical electrical grid assembly 260 may have higher applied secondary voltage rating and/or applied voltage differential across the vertical electrical grid assembly 260 than the horizontal electrical grid assembly 230, and thus the vertical electrical grid assembly 260 may be capable of providing a higher voltage potential in order to electrically coalesce water than the voltage potential created by the horizontal electrical grid assembly 230. The coalesced droplets of water and other effluent coalesced from the crude oil stream may exit from the second compartment 206 via one or more of the outlets 222, 224, and 226.

The pressure vessel 202 further comprises an overflow weir 228 that is disposed within the second compartment 206. The overflow weir 228 is downstream of the vertical electrical grid assembly 260 and is configured to mitigate coalesced droplets (removed from the crude oil stream) from passing over the overflow weir 228 and exiting crude outlet 280. This may be accomplished by the overflow weir 228 forming a seal with the inner walls of the pressure vessel 202 around a lower portion of the overflow weir 228, thereby directing flow path 254 through the passage 270, which is at an elevation (relative to the central axis 201) that is higher than the coalesced fluid can reach. After passing through the passage 270 and over the overflow weir 228, the crude oil stream may exit via crude outlet 280 of the pressure vessel 202. It is understood that pressure vessel 202 is configured to withstand a pressure differential between crude outlet 280 and inlet 212 of first distributor 210, such that the crude oil stream exits via the crude outlet 280 with less water content by liquid volume than when it entered via inlet 212.

Figure 6:
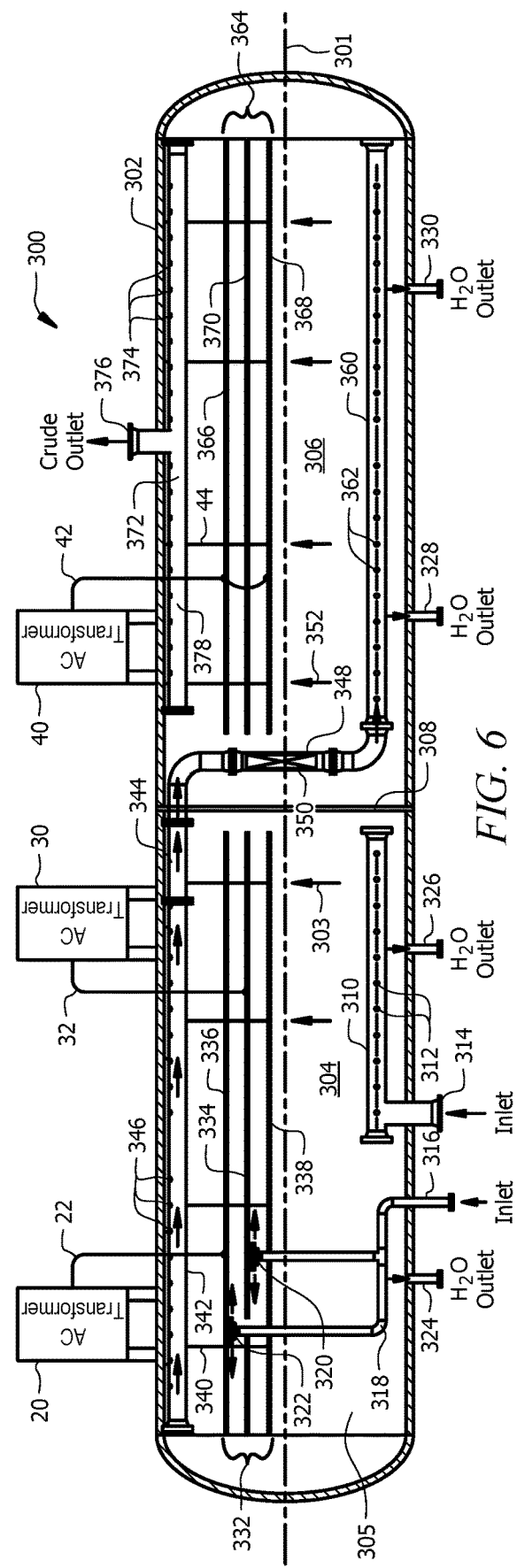
FIG. 6 illustrates a pressure vessel according to yet another embodiment of the disclosure.

Turning now to FIG. 6, a system 300 for desalting and dehydrating crude oil is disclosed according to another embodiment of the present disclosure. The system 300 comprises a pressure vessel 302 extending along central axis 301 while also defining a cavity 305. The pressure vessel 302 comprises a sealed bulkhead 308 disposed within the cavity 305 defined by the pressure vessel 302. The sealed bulkhead 308 is configured to divide the cavity into a first compartment 304 and a second compartment 306. The pressure vessel further comprises at least one distributor 310, 318 disposed within the first compartment 304. The distributors 310, 318 are configured to receive a crude oil stream via inlets 314 and 316, respectively, and provide fluid communication into the first compartment 304 via perforations 312 defined by the distributor 310. While two distributors are shown, only one such distributor may be used in some embodiments. As illustrated in FIG. 6, distributor 310 is configured as a pipe distributor and distributor 318 is configured as a radial distributor having a first radial outlet 320 and a second radial outlet 322. The distributor 310 can be disposed upstream from the horizontal electrical grid assembly 332, while the distributor 318 is at least partially disposed between electrical grid elements, specifically the first radial outlet 320 being disposed between electrical grids 334 and 338, and the second radial outlet 322 being disposed between electrical grids 334 and 336. Each of the first radial outlet 320 and second radial outlet 322 of distributor 318 is configured to eject a crude oil stream into the first compartment 304 at an orientation substantially parallel to the horizontal electrical grid assembly 332 and transverse to the flow path 303.

The pressure vessel 302 comprises horizontal electrical grid assembly 332 that is disposed within the first compartment 304. The horizontal electrical grid assembly 332 can be the same or similar to the second horizontal electrical grid assembly 170 described with respect to FIGS. 1-4, and any of the consideration described with respect to the second horizontal electrical grid assembly 170 can be used with the horizontal electrical grid assembly 332. The horizontal electrical grid assembly 332 is disposed within the first compartment 304 at an elevation between the collection header 342 of the transfer conduit 344 and at least one of the plurality of distributors 310, 318. The horizontal electrical grid assembly 332 can be energized by two or more alternating current (AC) power transformers (e.g., 20, 30). The horizontal electrical grid assembly 332 comprises at least three grid elements. The first AC power transformer 20 may energize electrical grid 336 via wiring 22, and second AC power transformer 30 may energize electrical grid 334 via wiring 32.

The AC power transformers 20, 30 may operate at the same or different frequency and may be in or out of phase each other. The electrical grid 338 may serve as a grounding grid when it is grounded via wiring 340, and thus at zero voltage. In some embodiments, the electrical grid 338 may be at a potential other than ground. In some embodiments, when electrical grid 334 is energized, it produces an electric field that is out of phase with the adjacent electrical grid 336 (which is energized by AC power transformer 20). In some embodiments, the electric field can be out of phase by between about 120 degrees (e.g., with three-phase power) and about 180 degrees (e.g., for two-phase power). The horizontal electrical grid assembly 332 is configured to create at least a first voltage potential that electrostatically coalesces water from the crude oil stream into droplets before the collection header 342 of the transfer conduit 344. The horizontal electrical grid assembly 332 may also create another voltage potential either due to electrical grids 336 and 334 being energized with different voltages and/or due to electrical grids 336, 334 being out of phase with each other. The pressure vessel 302 is configured to remove droplets that are coalesced out of the crude oil stream passing along flow path 303 via outlets 324 and 326.

The use of one or more radial outlets 320, 322 being disposed within the horizontal electrical grid assembly 332 and the distributor 310 having perforations 312 that are horizontal to the flow path 303 (e.g., coming out of the sides of the distributor 310 instead of the top) can result in a lower velocity flow of crude oil stream traveling along flow path 303, thereby allowing more time for electrical coalescence by horizontal electrical grid assembly 332. It is understood that the electrical grids 334, 336, and 338 of horizontal electrical grid assembly 332 and electrical grids 366, 368, and grid 370 of horizontal electrical grid assembly 364 are configured in a perforated grid that can condition fluid flow and provides the structure for electrical coalescence in each of the first compartment 304 and second compartment 306, respectively. In some embodiments, at least one of the horizontal electrical grid assembly 332, 364 can comprise a spacing adjuster configured to vary a distance between at least two of the grid elements, such as any of electrical grids 334, 336, and 338 of horizontal electrical grid assembly 332 or electrical grids 366, 368, and grid 370 the second horizontal electrical grid assembly 364.

The pressure vessel 302 further comprises a transfer conduit 344 that is disposed within the cavity 305 and passes through the sealed bulkhead 308 from the first compartment 304 to the second compartment 306. The transfer conduit 344 comprises a collection header 342 configured to receive the crude oil stream into the transfer conduit 344 via perforations 346, and provide fluid communication from the first compartment 304 to the second compartment 306. The transfer conduit 344 may comprise a distributor 360, which is configured as a pipe distributor having a plurality of perforations 362 to eject the crude oil stream into the second compartment 306. The perforations 362 may be defined along the side of the distributor 360 such that the crude oil stream is initially ejected horizontally before flowing vertically along flow path 352 towards the second horizontal electrical grid assembly 364.

The pressure vessel 302 may further comprise a fluid mixer 350 disposed within the pressure vessel 302 and in fluid communication with the transfer conduit 344. The fluid mixer 350 is disposed between the collection header 342 of the transfer conduit 344 and the distributor 360 of the transfer conduit 344 disposed in the second compartment 306. In some embodiments, the fluid mixer comprises a static mixer (e.g., a nozzle, spiral nozzle) and/or an externally adjustable mixer (e.g., an externally adjustable nozzle that varies the incoming and/or outgoing aperture of the nozzle). In some embodiments, the pressure vessel 302 may comprise a dilution conduit 348 that is disposed upstream from the fluid mixer 350.

The pressure vessel 302 further comprises a second horizontal electrical grid assembly 364 disposed within the second compartment 306 and aligned substantially transverse to a flow path 352, where the flow path 352 is extending from the distributor 360 of the transfer conduit 344 to the crude collection header 378 of the crude collector 372. The second horizontal electrical grid assembly 364 is disposed between the crude collection header 378 and at least a portion of the transfer conduit 344, specifically distributor 360. The second horizontal electrical grid assembly 364 comprises a plurality of electrical grids, such as electrical grids 366 and 368. The second horizontal electrical grid assembly 364 also has at least one electrical grid such as grid 370 that can be at a different voltage potential. In some embodiments, the grid 370 can be at a ground potential, while in other embodiments, the grid 370 can be at a different potential that the remaining grids to create a voltage difference between the grids. AC power transformer 40 may energize electrical grids 366 and 368 via wiring 42, and grid 370 may be configured to be grounded via wiring 44 (thus resulting in a zero voltage that allows for voltage potentials to be created). Thus, the second horizontal electrical grid assembly 364 is configured to create a second voltage potential that electrostatically coalesces water into droplets before the crude collection header 378 in the second compartment 306. The second voltage potential created by the second horizontal electrical grid assembly 364 can be greater than the first voltage potential created by the first horizontal electrical grid assembly 332 in the first compartment 304. The second horizontal electrical grid assembly 364 can be energized by an AC power transformer that provides a voltage differential to electrical grids 366, 368 that is higher than the voltage differential provided by AC power transformers 20 and 30.

The pressure vessel 302 is configured to remove droplets that are coalesced out of the crude oil stream passing along flow path 352 in the second compartment 306 via outlets 328 and 330. The pressure vessel 302 further comprises a crude collector 372 disposed within the second compartment 306. The crude collector 372 comprises a crude collection header 378 configured to receive the crude oil stream via perforations 374 after the second horizontal electrical grid assembly 364 electrically coalesces water into droplets for removal from the second compartment 306. The crude collector 372 is configured to communicate fluid out of the second compartment 306 to an outlet 376 of the crude collector 372.

The present disclosure includes methods of desalting and dehydrating crude oil via a single pressure vessel, such as any one of pressure vessel 102 of FIGS. 1-4, pressure vessel 202 of FIG. 5, and/or pressure vessel 302 of FIG. 6. The method comprises receiving a crude oil stream into a first distributor disposed within a first compartment of a pressure vessel, where the first compartment is separated from a second compartment by a sealed bulkhead, and the first compartment comprises a first electrical grid assembly. The method continues by injecting, within the first compartment via the first distributor, the crude oil stream before at least a portion of the first electrical grid assembly along a first flow path.

Next, the method may continue with electrostatically coalescing, by passing the diluted crude oil stream through the first electrical grid assembly being energized to a first voltage potential, water from the crude oil stream into droplets. The method further comprises preventing, within the first compartment, coalesced droplets from entering an intake of a transfer conduit by separating the coalesced droplets from the intake of the transfer conduit. The transfer conduit can optionally be within the pressure vessel and pass through the sealed bulkhead such that the transfer conduit fluidly communicates the crude oil stream from the first compartment to the second compartment. In some embodiments, preventing coalesced droplets from entering the intake of the transfer conduit is based on an overflow weir separating the coalesced droplets from the intake of the transfer conduit. In other embodiments, preventing coalesced droplets from entering the intake of the transfer conduit is based on the intake of the transfer conduit being disposed within the first compartment at an elevation above the first electrical grid assembly.

The method also includes transferring the crude oil stream to the second compartment via the transfer conduit. Transferring may comprise directing, via an overflow weir, the crude oil stream from the first flow path and towards the intake of the transfer conduit. The method continues with diluting, via a dilution conduit and a fluid mixer inline with the transfer conduit, the crude oil stream in the transfer conduit with water. In some embodiments, diluting comprises introducing water into the transfer conduit via the dilution conduit and mixing the crude oil stream with the water via the fluid mixer. Introducing the water may occur upstream from the fluid mixer. Subsequent to diluting, the method continues with distributing, via a distributor of the transfer conduit in the second compartment, the diluted crude oil stream before at least a portion of a second electrical grid assembly. In some embodiments, distributing comprises ejecting the diluted crude oil stream at an orientation substantially orthogonal to a second flow path in the second compartment.

The method further includes electrostatically coalescing, by passing the diluted crude oil stream through the second electrical grid assembly being energized to a second voltage potential, water from the diluted crude oil stream into droplets. In some embodiments, the second electrical grid assembly comprises at least two grid elements that each extend substantially orthogonal to the first electrical grid assembly. Subsequent to the electrostatically coalescing, the method may continue with removing crude oil from the second compartment via a crude collector disposed within the second compartment. In some embodiments, the method includes removing the coalesced droplets from first compartment via an outlet in the vessel. In some embodiments, the method may also further comprise removing the coalesced droplets from second compartment via a second outlet in the pressure vessel.

Having described various devices, systems, and methods, some embodiments can include, but are not limited to:

In a first embodiment, a system for crude oil desalting and dehydration comprises: a pressure vessel defining a cavity and extending along a central axis, the pressure vessel comprising: a sealed bulkhead disposed within the cavity, the sealed bulkhead separating the cavity into a first compartment and a second compartment; a first distributor disposed within the first compartment, wherein the first distributor is configured to receive a crude oil stream and provide fluid communication into the first compartment via an inlet of the first distributor; a transfer conduit that is disposed within the cavity, the second compartment being in fluid communication with the first compartment via the transfer conduit; a first electrical grid assembly disposed within the first compartment, the first electrical grid assembly disposed between an intake of the transfer conduit and at least a portion of the first distributor; a crude outlet disposed within the second compartment, the crude outlet configured to communicate the crude oil out of the second compartment; a second electrical grid assembly disposed within the second compartment, wherein the second electrical grid assembly is not aligned with the first electrical grid assembly.

A second embodiment can include the system of the first embodiment, further comprising a fluid mixer, wherein the fluid mixer is in fluid communication with the transfer conduit and disposed between an intake of the transfer conduit and a distributor of the transfer conduit.

A third embodiment can include the system of the second embodiment, wherein the fluid mixer comprises a static mixer or an externally adjustable mixer.

A fourth embodiment can include the system of any of the first to third embodiments, wherein the first electrical grid assembly is configured to be energized by a power transformer.

A fifth embodiment can include the system of any of the first to fourth embodiments, wherein the first electrical grid assembly is configured to create a first voltage potential that electrostatically coalesces water from the crude oil stream into droplets before the intake of the transfer conduit.

A sixth embodiment can include the system of any of the first to fourth embodiments, wherein the first electrical grid assembly comprises at least two grid elements and a spacing adjuster configured to vary a distance between at least two of the grid elements.

A seventh embodiment can include the system of any of the first to sixth embodiments, wherein the pressure vessel further comprising an overflow weir disposed within the first compartment, wherein the overflow weir is configured to define a passage over the weir that directs the crude oil stream toward the intake of the transfer conduit and mitigates coalesced droplets from entering the intake of the transfer conduit.

An eighth embodiment can include the system of any of the first to seventh embodiments, wherein the second electrical grid assembly is disposed between the crude collection header and at least a portion of the transfer conduit.

A ninth embodiment can include the system of any of the first to eighth embodiments, wherein the second electrical grid assembly comprises at least two grid elements that each extend substantially orthogonal to the first electrical grid assembly.

A tenth embodiment can include the system of any of the first to ninth embodiments, wherein the second electrical grid assembly is configured to create a second voltage potential that electrostatically coalesces water into droplets before the crude collection header.

An eleventh embodiment can include the system of any of the first to tenth embodiments, wherein the second voltage potential created by the second electrical grid assembly is greater than the first voltage potential created by the first electrical grid assembly.

A twelfth embodiment can include the system of any of the first to eleventh embodiments, wherein the second electrical grid assembly comprises a first set of electrical grids and a second set of electrical grids.

A thirteenth embodiment can include the system of the twelfth embodiment, wherein the first set is configured to be electrically out of phase from the second set of electrical grids in response to being energized by a power transformer.

A fourteenth embodiment can include the system of any of the first to thirteenth embodiments, wherein the pressure vessel further comprising a dilution conduit that defines a channel extending from outside the cavity and into the transfer conduit.

A fifteenth embodiment can include the system of the fourteenth embodiment, wherein the dilution conduit is configured to introduce dilution fluid within the transfer conduit and upstream of the fluid mixer.

A sixteenth embodiment can include the system of the fifteenth embodiment, wherein the dilution fluid comprises at least one of water, a demulsifier, or a combination thereof.

In a seventeenth embodiment, a method of desalting and dehydrating crude oil via a single pressure vessel comprises: receiving a crude oil stream into a first distributor disposed within a first compartment of a pressure vessel, the first compartment being separated from a second compartment by a sealed bulkhead, the first compartment comprising a first electrical grid assembly; injecting, within the first compartment via the first distributor, the crude oil stream before at least a portion of the first electrical grid assembly along a first flow path; electrostatically coalescing, by passing the diluted crude oil stream through the first electrical grid assembly being energized to a first voltage potential, water from the crude oil stream into droplets; preventing, within the first compartment, coalesced droplets from entering an intake of a transfer conduit by separating the coalesced droplets from the intake of the transfer conduit, wherein the transfer conduit is within the pressure vessel and passes through the sealed bulkhead and fluidly communicates the crude oil stream from the first compartment to the second compartment; transferring the crude oil stream to the second compartment via the transfer conduit; diluting, via a dilution conduit and a fluid mixer in-line with the transfer conduit, the crude oil stream in the transfer conduit with water; subsequent to diluting, distributing, via a distributor of the transfer conduit in the second compartment, the diluted crude oil stream before at least a portion of a second electrical grid assembly; electrostatically coalescing, by passing the diluted crude oil stream through the second electrical grid assembly being energized to a second voltage potential, water from the diluted crude oil stream into droplets; subsequent to the electrostatically coalescing, removing crude oil from the second compartment via a crude collector disposed within the second compartment.

An eighteenth embodiment can include the method of the seventeenth embodiment, wherein preventing coalesced droplets from entering the intake of the transfer conduit is based on an overflow weir separating the coalesced droplets from the intake of the transfer conduit.

A nineteenth embodiment can include the method of the seventeenth embodiment, wherein preventing coalesced droplets from entering the intake of the transfer conduit is based on the intake of the transfer conduit being disposed within the first compartment at an elevation above the first electrical grid assembly.

A twentieth embodiment can include the method of any of the seventeenth to nineteenth embodiments, further comprising removing the coalesced droplets from first compartment via an outlet in the vessel.

A twenty first embodiment can include the method of any of the seventeenth to twentieth embodiments, wherein transferring comprises directing, via an overflow weir, the crude oil stream from the first flow path and towards the intake of the transfer conduit.

A twenty second embodiment can include the method of any of the seventeenth to twenty first embodiments, wherein diluting comprises introducing water into the transfer conduit via the dilution conduit and mixing the crude oil stream with the water via the fluid mixer.

A twenty third embodiment can include the method of any of the seventeenth to twenty second embodiments, wherein introducing the water occurs upstream from the fluid mixer.

A twenty fourth embodiment can include the method of any of the seventeenth to twenty third embodiments, wherein distributing comprises ejecting the diluted crude oil stream at an orientation substantially orthogonal to a second flow path in the second compartment.

A twenty fifth embodiment can include the method of any of the seventeenth to twenty fourth embodiments, wherein the second electrical grid assembly comprises at least two grid elements that each extend substantially orthogonal to the first electrical grid assembly.

A twenty sixth embodiment can include the method of any of the seventeenth to twenty fifth embodiments, further comprising removing the coalesced droplets from second compartment via a second outlet in the vessel.

In a twenty seventh embodiment, a pressure vessel for crude oil desalting and dehydration comprises: a sealed bulkhead disposed within a cavity defined by the pressure vessel, the sealed bulkhead configured to divide the cavity into a first compartment and a second compartment; a first distributor disposed within the first compartment, wherein the first distributor is configured to receive a crude oil stream and provide fluid communication into the first compartment via an inlet of the first distributor; a transfer conduit that is disposed within the cavity and passes through the bulkhead from the first compartment to the second compartment, wherein the transfer conduit comprises a collection header configured to receive the crude oil stream from the first compartment and provide fluid communication to the second compartment via the transfer conduit; a horizontal electrical grid assembly disposed within the first compartment, the horizontal electrical grid assembly disposed between the collection header of the transfer conduit and at least a portion of the first distributor; an overflow weir disposed within the second compartment, wherein the overflow weir is configured to define a passage over the weir that directs the crude oil stream toward a crude outlet and mitigate coalesced droplets from passing over the overflow weir; and a vertical electrical grid assembly disposed within the second compartment and aligned substantially transverse to a horizontal flow path extending from the transfer conduit to the overflow weir, wherein the vertical electrical grid assembly is energized by a direct current (DC) power transformer.

A twenty eight embodiment can include the system of the twenty seventh embodiment, further comprising a fluid mixer that is in fluid communication with the transfer conduit and disposed between an intake of the transfer conduit and a distributor of the transfer conduit.

A twenty ninth embodiment can include the system of the twenty eighth embodiment, wherein the fluid mixer comprises a static mixer, wherein the fluid mixer comprises an externally adjustable mixer.

A thirtieth embodiment can include the system of any of the twenty seventh to twenty ninth embodiments, wherein the horizontal electrical grid assembly is energized by an alternating current (AC) power transformer.

A thirty first embodiment can include the system of any of the twenty seventh to thirtieth embodiments, wherein the horizontal electrical grid assembly is configured to create a first voltage potential that electrostatically coalesces water from the crude oil stream into droplets before the collection header of the transfer conduit.

A thirty second embodiment can include the system of any of the twenty seventh to thirty first embodiments, wherein the horizontal electrical grid assembly comprises at least two grid elements and a spacing adjuster configured to vary a distance between at least two of the grid elements.

A thirty third embodiment can include the system of any of the twenty seventh to thirty second embodiments, wherein the vertical electrical grid assembly comprises at least two grid elements that each extend substantially orthogonal to the first electrical grid assembly.

A thirty fourth embodiment can include the system of any of the twenty seventh to thirty third embodiments, wherein the vertical electrical grid assembly is configured to create a second voltage potential that electrostatically coalesces water into droplets before the overflow weir.

A thirty fifth embodiment can include the system of any of the twenty seventh to thirty fourth embodiments, wherein the second voltage potential created by the vertical electrical grid assembly is greater than the first voltage potential created by the horizontal electrical grid assembly.

A thirty sixth embodiment can include the system of any of the twenty seventh to thirty fifth embodiments, wherein the pressure vessel further comprising a dilution conduit that defines a channel extending from outside the cavity and into the transfer conduit.

A thirty seventh embodiment can include the system of the thirty sixth embodiment, wherein the dilution conduit is configured to introduce dilution fluid within the transfer conduit and upstream of the fluid mixer.

A thirty eighth embodiment can include the system of the thirty seventh embodiment, wherein the dilution fluid comprises at least one of water, a solvent, a polymer, a demulsifier, or a combination thereof.

A thirty ninth embodiment can include the system of any of the twenty seventh to thirty eighth embodiments, wherein the vertical electrical grid assembly is disposed between the overflow weir and at least a portion of the transfer conduit.

In a fortieth embodiment, a pressure vessel for crude oil desalting and dehydration comprises: a sealed bulkhead disposed within a cavity defined by the pressure vessel, the sealed bulkhead configured to divide the cavity into a first compartment and a second compartment; a plurality of distributors disposed within the first compartment, wherein each of the plurality of distributors is configured to receive a crude oil stream and provide fluid communication into the first compartment via inlets; a transfer conduit that is disposed within the cavity and passes through the bulkhead from the first compartment to the second compartment, wherein the transfer conduit comprises a collection header configured to receive the crude oil stream from the first compartment and provide fluid communication to the second compartment via the transfer conduit; a horizontal electrical grid assembly disposed within the first compartment, the horizontal electrical grid assembly disposed between the collection header of the transfer conduit and at least one of the plurality of distributors; a fluid mixer within the pressure vessel and is in fluid communication with the transfer conduit and disposed between the collection header of the transfer conduit and a distributor of the transfer conduit disposed in the second compartment; a crude collector disposed within the second compartment, the crude collector comprising a collection header configured to communicate fluid out of the second compartment to an outlet of the crude collector; and a second horizontal electrical grid assembly disposed within the second compartment and aligned substantially transverse to a flow path extending from the transfer conduit to the crude collection header.

A forty first embodiment can include the pressure vessel of the fortieth embodiment, wherein the horizontal electrical grid assembly is energized by at least two alternating current (AC) power transformers.

A forty second embodiment can include the pressure vessel of the fortieth or forty first embodiment, wherein the horizontal electrical grid assembly is configured to create a first voltage potential that electrostatically coalesces water from the crude oil stream into droplets before the collection header of the transfer conduit.

A forty third embodiment can include the pressure vessel of any of the fortieth to forty second embodiments, wherein the horizontal electrical grid assembly comprises at least three grid elements and a spacing adjuster configured to vary a distance between at least two of the grid elements.

A forty fourth embodiment can include the pressure vessel of any of the fortieth to forty third embodiments, wherein the fluid mixer comprises at least one of a static mixer, an externally adjustable mixer, or a combination thereof.

A forty fifth embodiment can include the pressure vessel of any of the fortieth to forty fourth embodiments, wherein the second electrical grid assembly is disposed between the crude collection header and at least a portion of the transfer conduit.

A forty sixth embodiment can include the pressure vessel of any of the fortieth to forty fifth embodiments, wherein the second horizontal electrical grid assembly is configured to create a second voltage potential that electrostatically coalesces water into droplets before the crude collection header in the second compartment.

A forty seventh embodiment can include the pressure vessel of the forty sixth embodiment, wherein the second voltage potential created by the second horizontal electrical grid assembly is greater than the first voltage potential created by the first electrical grid assembly in the first compartment, wherein the second horizontal electrical grid assembly is energized by an AC power transformer.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented. The particular naming of the components, capitalization of terms, the attributes, structures, or any other structural aspect is not mandatory or significant, and the mechanisms that implement the disclosure or its features may have different names, formats, or protocols. Also, the particular division of functionality between the various components described herein is merely exemplary, and not mandatory; functions performed by a single system component may instead be performed by multiple components, and functions performed by multiple components instead may be performed by a single component. Finally, it should be noted that the language used in the specification has been principally selected for readability and instructional purposes, and may not have been selected to delineate or circumscribe the subject matter.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. The word "exemplary" is used herein to mean "serving as an example, instance, or illustration." Any implementation described herein as "exemplary" is not necessarily to be construed as preferred or advantageous over other implementations. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A system for crude oil desalting and dehydration, the system comprising:
a pressure vessel defining a cavity and extending along a central axis, the pressure vessel comprising:
a sealed bulkhead disposed within the cavity, the sealed bulkhead separating the cavity into a first compartment and a second compartment;
a first distributor disposed within the first compartment, wherein the first distributor is configured to receive a crude oil stream and provide fluid communication into the first compartment via an inlet of the first distributor;
a transfer conduit that is disposed within the cavity, the second compartment being in fluid communication with the first compartment via the transfer conduit;
a first electrical grid assembly disposed within the first compartment, the first electrical grid assembly disposed between an intake of the transfer conduit and at least a portion of the first distributor;
a crude outlet disposed within the second compartment, the crude outlet configured to communicate the crude oil out of the second compartment;
a second electrical grid assembly disposed within the second compartment, wherein the second electrical grid assembly is not aligned with the first electrical grid assembly.

2. The system of claim 1, further comprising a fluid mixer, wherein the fluid mixer is in fluid communication with the transfer conduit and disposed between an intake of the transfer conduit and a distributor of the transfer conduit, wherein the fluid mixer comprises a static mixer or an externally adjustable mixer.

3. The system of claim 1, wherein the first electrical grid assembly is configured to be energized by a power transformer, and wherein the first electrical grid assembly is configured to create a first voltage potential that electrostatically coalesces water from the crude oil stream into droplets before the intake of the transfer conduit.

4. The system of claim 1, wherein the first electrical grid assembly comprises at least two grid elements and a spacing adjuster configured to vary a distance between at least two of the grid elements.

5. The system of claim 1, wherein the pressure vessel further comprising an overflow weir disposed within the first compartment, wherein the overflow weir is configured to define a passage over the weir that directs the crude oil stream toward the intake of the transfer conduit and mitigate coalesced droplets from entering the intake of the transfer conduit.

6. The system of claim 1, wherein the second electrical grid assembly is disposed between the crude outlet and at least a portion of the transfer conduit, and wherein the second electrical grid assembly comprises at least two grid elements that each extend substantially orthogonal to the first electrical grid assembly.

7. A method of desalting and dehydrating crude oil via a single pressure vessel, the method comprising:
receiving a crude oil stream into a first distributor disposed within a first compartment of a pressure vessel, the first compartment being separated from a second compartment by a sealed bulkhead, the first compartment comprising a first electrical grid assembly;
injecting, within the first compartment via the first distributor, the crude oil stream before at least a portion of the first electrical grid assembly along a first flow path;
electrostatically coalescing, by passing the diluted crude oil stream through the first electrical grid assembly being energized to a first voltage potential, water from the crude oil stream into droplets;
preventing, within the first compartment, coalesced droplets from entering an intake of a transfer conduit by separating the coalesced droplets from the intake of the transfer conduit, wherein the transfer conduit is within the pressure vessel and passes through the sealed bulkhead and fluidly communicates the crude oil stream from the first compartment to the second compartment;
transferring the crude oil stream to the second compartment via the transfer conduit;
diluting, via a dilution conduit and a fluid mixer inline with the transfer conduit, the crude oil stream in the transfer conduit with a diluent;

subsequent to diluting, distributing, via a distributor of the transfer conduit in the second compartment, the diluted crude oil stream before at least a portion of a second electrical grid assembly;

electrostatically coalescing, by passing the diluted crude oil stream through the second electrical grid assembly being energized to a second voltage potential, water from the diluted crude oil stream into droplets;

subsequent to the electrostatically coalescing, removing crude oil from the second compartment via a crude collector disposed within the second compartment.

8. The method of claim 7, wherein preventing coalesced droplets from entering the intake of the transfer conduit is based on an overflow weir separating the coalesced droplets from the intake of the transfer conduit, and wherein preventing coalesced droplets from entering the intake of the transfer conduit is based on the intake of the transfer conduit being disposed within the first compartment at an elevation at or above the first electrical grid assembly.

9. The method of claim 7, further comprising removing the coalesced droplets from the first compartment via an outlet in the vessel.

10. The method of claim 7, wherein diluting comprises introducing the diluent into the transfer conduit via the dilution conduit and mixing the crude oil stream with the diluent via the fluid mixer, and wherein introducing the diluent occurs upstream from the fluid mixer.

11. The method of claim 7, wherein the second electrical grid assembly comprises at least two grid elements that each extend substantially orthogonal to the first electrical grid assembly.

12. The system of claim 1:
wherein the transfer conduit passes through the sealed bulkhead from the first compartment to the second compartment,
wherein the transfer conduit comprises a collection header configured to receive the crude oil stream from the first compartment and provide fluid communication to the second compartment via the transfer conduit;
wherein the first electrical grid assembly comprises a horizontal electrical grid assembly disposed within the first compartment, the horizontal electrical grid assembly disposed between the collection header of the transfer conduit and at least a portion of the first distributor; and
wherein the second grid assembly comprises a vertical electrical grid assembly disposed within the second compartment and aligned substantially transverse to a horizontal flow path extending from the transfer conduit to an overflow weir, wherein the vertical electrical grid assembly is energized by a direct current (DC) power transformer.

13. The system of claim 12, wherein the horizontal electrical grid assembly is energized by an alternating current (AC) power transformer.

14. The system of claim 12, wherein the vertical electrical grid assembly is configured to create a second voltage potential that electrostatically coalesces water into droplets before the overflow weir, and wherein the second voltage potential created by the vertical electrical grid assembly is greater than a first voltage potential created by the horizontal electrical grid assembly.

15. The system of claim 12, wherein the pressure vessel further comprising a dilution conduit that defines a channel extending from outside the cavity and into the transfer conduit, wherein a fluid mixer is in fluid communication with the transfer conduit and disposed between an intake of the transfer conduit and a distributor of the transfer conduit, and wherein the dilution conduit is configure to introduce dilution fluid within the transfer conduit and upstream of the fluid mixer.

16. The system of claim 15, wherein the dilution fluid comprises at least one of water, a demulsifier, or a combination thereof.

17. The system of claim 12, wherein the vertical electrical grid assembly is disposed between the overflow weir and at least a portion of the transfer conduit.

18. A pressure vessel for crude oil desalting and dehydration, the pressure vessel comprising:
a sealed bulkhead disposed within a cavity defined by the pressure vessel, the sealed bulkhead configured to divide the cavity into a first compartment and a second compartment;
a plurality of distributors disposed within the first compartment, wherein each of the plurality of distributors is configured to receive a crude oil stream and provide fluid communication into the first compartment via inlets;
a transfer conduit that is disposed within the cavity and passes through the bulkhead from the first compartment to the second compartment, wherein the transfer conduit comprises a collection header configured to receive the crude oil stream from the first compartment and provide fluid communication to the second compartment via the transfer conduit;
a horizontal electrical grid assembly disposed within the first compartment, the horizontal electrical grid assembly disposed between the collection header of the transfer conduit and at least one of the plurality of distributors;
a fluid mixer within the pressure vessel and is in fluid communication with the transfer conduit and disposed between the collection header of the transfer conduit and a distributor of the transfer conduit disposed in the second compartment;
a crude collector disposed within the second compartment, the crude collector comprising a collection header configured to communicate fluid out of the second compartment to an outlet of the crude collector; and
a second horizontal electrical grid assembly disposed within the second compartment and aligned substantially transverse to a flow path extending from the transfer conduit to the crude collection header.

19. The pressure vessel of claim 18, wherein the horizontal electrical grid assembly is energized by at least two alternating current (AC) power transformers, and wherein the horizontal electrical grid assembly comprises at least three grid elements and a spacing adjuster configured to vary a distance between at least two of the grid elements.

20. The pressure vessel of claim 18, wherein the second horizontal electrical grid assembly is configured to create a second voltage potential that electrostatically coalesces water into droplets before the crude collection header in the second compartment, and wherein the second voltage potential created by the second horizontal electrical grid assembly is greater than the first voltage potential created by the first electrical grid assembly in the first compartment.

* * * * *